United States Patent Office 2,942,944
Patented June 28, 1960

2,942,944
PROCESS OF PREPARING ZIRCONIUM OXYCHLORIDE

Harley A. Wilhelm and Maurice L. Andrews, Ames, Iowa, assignors to the United States of America as represented by the United States Atomic Energy Commission No Drawing. Filed Nov. 26, 1958, Ser. No. 776,649

3 Claims. (Cl. 23—85)

This invention deals with a process of preparing zirconium oxychloride.

Hafnium and zirconium, which mostly occur together, have been separated heretofore by extraction with an organic substantially water-immiscible solvent. For some of these extraction separation processes zirconium oxychloride or zirconyl chloride, $ZrOCl_2$, is the salt preferred in the feed solution to be processed. The hafnium-free zirconium oxychloride can then be converted to the chloride and then in turn be used for the production of pure zirconium metal by the reduction with alkaline earth metal in the so-called bomb process. This pure zirconium has a lower neutron-capture cross section than that contaminated with hafnium and is therefore preferred for use in neutronic reactors.

Zirconium oxychloride as such, too, has a great many applications; for instance, it is used in the tanning industry. Esters of zirconyl fatty acid salts are used as waterproofing agents.

Zirconyl chloride has been made heretofore by reacting zirconium chloride with water. This reaction takes place according to the following equations:

$$ZrCl_4 + H_2O \rightarrow ZrOCl_2 + 2HCl$$

and $$ZrCl_4 + 9H_2O \rightarrow ZrOCl_2 \cdot 8aq. + 2HCl.$$

However, this process has a number of disadvantages. The reaction is highly exothermic, and considerable dilution is required to avoid spattering. This great dilution, in turn, makes subsequent concentration necessary. Furthermore hydrochloric acid is formed during the reaction which has to be removed, for instance by crystallization of the salt. Concentration and crystallization are two steps that add to the cost of the product.

It is an object of this invention to provide a process of producing zirconyl chloride practically free from hydrochloric acid which does not require a concentration step nor a crystallization step.

It is another object of this invention to provide a process of producing zirconyl chloride in which the hydrochloric acid formed is automatically removed at a controlled rate.

Finally it is also an object of this invention to provide a process for the production of zirconyl chloride in which the product is immediately obtained in solid form.

It has been found that, by mixing solid zirconium oxychloride and solid zirconium chloride, a reaction takes place and zirconium oxychloride is formed and that this reaction is exothermic enough to bring about volatilization of the hydrochloric acid formed but not so exothermic as to make the process uncontrollable.

The process of this invention thus comprises the step of mixing solid zirconyl chloride and solid zirconium tetrachloride, whereby the zirconium tetrachloride is converted to zirconyl chloride and hydrogen chloride is formed and volatilized.

The reaction between the zirconium tetrachloride and the zirconyl chloride proceeds according to the following equation:

$$5ZrCl_4 + 4ZrOCl_2 \cdot 8H_2O = 9ZrOCl_2 \cdot 3H_2O + 10HCl$$

The zirconyl chloride trihydrate is obtained in the form of crystals. The reaction heat of this process suffices to bring about volatilization of the bulk of the hydrochloric acid formed. This hydrochloric acid, of course, is advantageously condensed and collected as a valuable by-product. The oxychloride and tetrachloride are preferably used in stoichiometric quantities. The normal yield is about 100%.

The trihydrate of the zirconyl chloride can then be converted to the octahydrate by the addition of water. Forty-five moles of water are necessary for the conversion of 9 moles of zirconyl chloride trihydrate, since the hydration proceeds according to the following equation:

$$9ZrOCl_2 \cdot 3H_2O + 45H_2O = 9ZrOCl_2 \cdot 8H_2O$$

This hydration is also exothermic, although less so than the reaction of the zirconium and zirconyl chlorides. Any hydrochloric acid that was not volatilized during the latter reaction is driven off by the hydration heat. The water has to be added slowly to avoid too violent a reaction and spattering. Part of the zirconyl chloride thus formed is recycled for reaction with a new batch of zirconium tetrachloride; the other part, namely 5 moles out of 9 moles formed, is drawn off as the final product.

In the following an example is given of the process of this invention for illustrative purposes without the intention to have the invention limited to the details given therein.

Example

Zirconyl chloride octahydrate, 149 grams, was mixed with 135 grams of zirconium tetrachloride at room temperature, and the mixture was allowed to stand for about one hour. The reaction vessel became hot and hydrochloric acid vapors escaped. The zirconyl chloride trihydrate obtained weighed 267 grams. Water was then gradually added in an amount of about 104 grams. The mixture, after standing overnight, was found to weigh 340 grams.

These 340 grams of the oxychloride were then mixed with 308 grams of zirconium tetrachloride. After one hour the reaction was believed to be complete. 214 grams of water were then slowly added, and the reaction mass was stirred to obtain uniform heat distribution. The final product was a solid powder containing a few lumps; after standing for several hours, its weight was determined to be 765 grams.

It will be understood that this invention is not to be limited to the details given herein but that it may be modified within the scope of the appended claims.

What is claimed is:

1. A process of preparing zirconyl chloride, comprising the step of mixing solid zirconyl chloride octahydrate and solid zirconium tetrachloride, whereby the zirconium tetrachloride is converted to zirconyl chloride and hydrogen chloride is formed and volatilized.

2. The process of claim 1 wherein about four moles of zirconyl chloride octahydrate and about five moles of zirconium tetrachloride are mixed and zirconyl chloride trihydrate is obtained.

3. A process of preparing zirconyl chloride, consisting of mixing about four moles of solid zirconyl chloride octahydrate and about five moles of solid zirconium tetrachloride whereby zirconyl chloride trihydrate is formed and hydrogen chloride is volatilized, and adding water in approximately stoichiometric quantity to the zirconyl chloride whereby zirconyl chloride octahydrate is formed and any remaining hydrogen chloride is volatilized.

References Cited in the file of this patent

FOREIGN PATENTS 480,698    Great Britain ‎_____ Feb. 25, 1938

OTHER REFERENCES

Mellor: "Comprehensive Treatise on Inorganic and Theoretical Chemistry," vol. 7, page 146 (1927), Longmans, Green and Co., New York, N.Y.

Blumenthal: "The Chemical Behavior of Zirconium," page 126, copyright Oct. 29, 1958, by D. Van Nostrand Co., N.Y.